April 4, 1950 A. G. DREYER 2,502,834
AMUSEMENT DEVICE SIMULATING AIR COMBAT
Filed Sept. 4, 1945 3 Sheets-Sheet 1
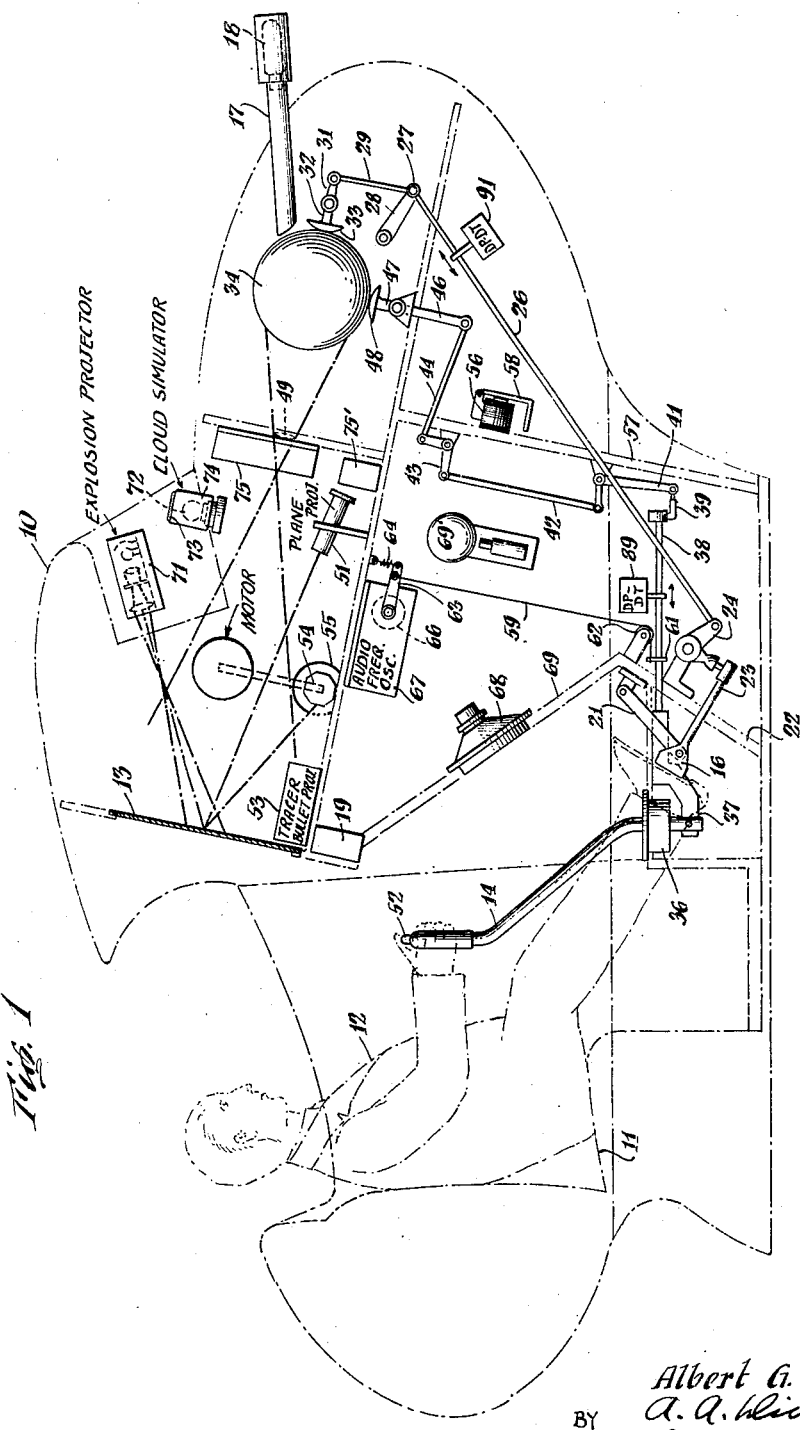
INVENTOR
Albert G. Dreyer
BY
ATTORNEYS April 4, 1950 A. G. DREYER 2,502,834
AMUSEMENT DEVICE SIMULATING AIR COMBAT
Filed Sept. 4, 1945 3 Sheets-Sheet 2
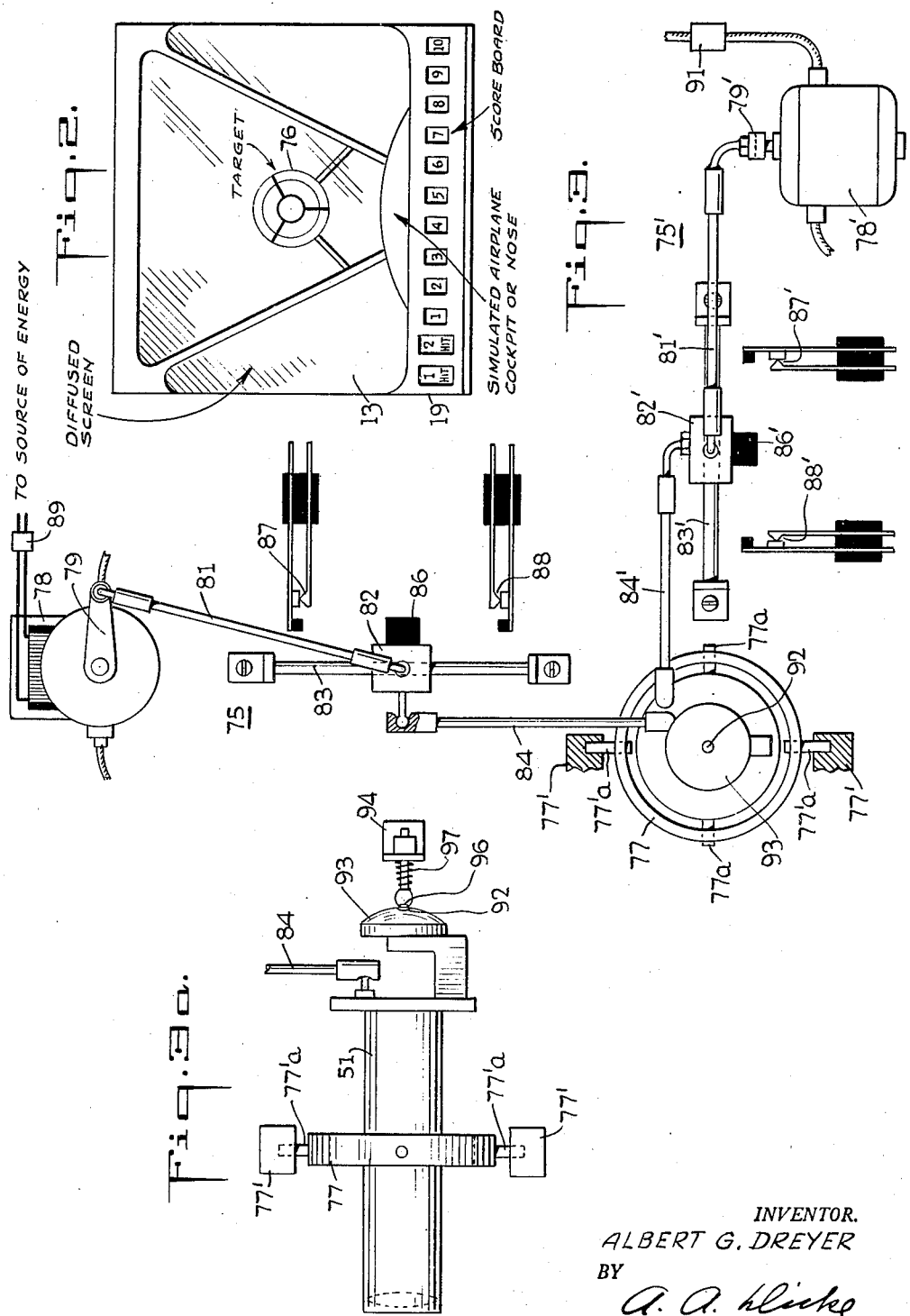
INVENTOR.
ALBERT G. DREYER
BY
ATTORNEY

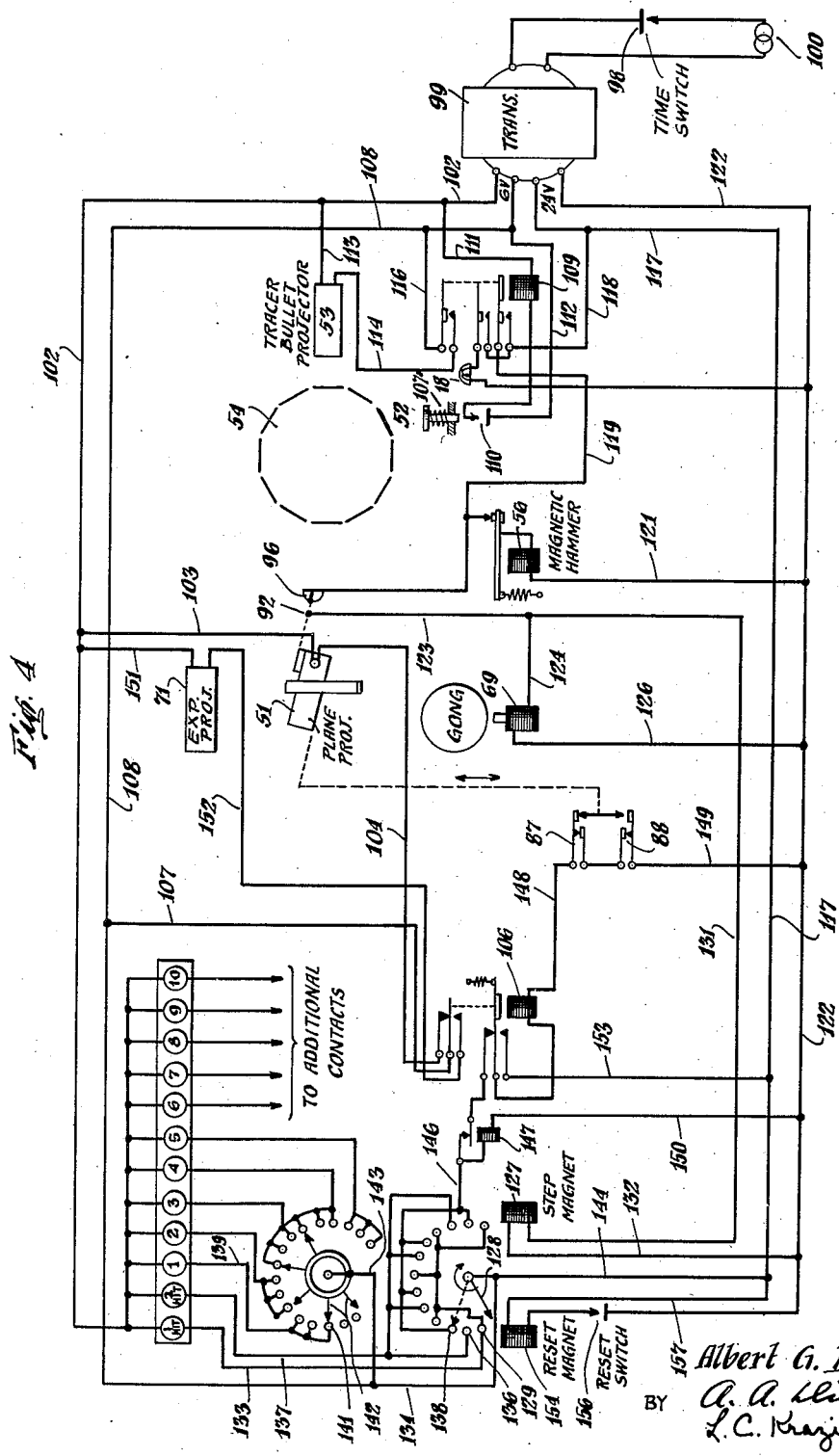

Patented Apr. 4, 1950

2,502,834

UNITED STATES PATENT OFFICE 2,502,834

AMUSEMENT DEVICE SIMULATING AIR COMBAT

Albert G. Dreyer, Scotch Plains, N. J.

Application September 4, 1945, Serial No. 614,122

9 Claims. (Cl. 35—25)

This invention relates to amusement devices simulating air combat, and has for an object to provide a simulation of a plane together with apparatus adapted for simulating destruction of another plane.

Another object of the invention is to provide an improved device of the type disclosed in Patent 2,289,877, issued July 14, 1942, to Albert G. Dreyer, by adapting the aircraft for simulation of gun fire upon a target, such as another aircraft.

Still another object of the invention is to provide a novel mechanism for simulating by sound effects the flight of an aircraft, as well as, machine gun fire.

A further object of the invention is to provide a novel mechanism for simulating destruction of a target following a predetermined number of hits registered thereon.

Yet a further object of the invention is to provide a more realistic illusion of destruction of a target, such as an aircraft, by illustrating explosion of the aircraft by a variety of colors.

A still further object of the invention is to provide a novel mechanism for registering the number of hits made on an aircraft and the number of aircraft destroyed.

An additional object of the invention is to provide a cloud or horizon simulator for indicating the idling period of the device.

With these objects in view, one embodiment of the invention discloses a simulated aircraft housing within which is provided an operator's position readily accessible to a conventional joy stick and rudder pedals for controlling through respective linkages universal rotation of a pictorial sphere having terrestrial objects thereon, the moving image of portions of the earth's surface or sky being flashed upon a screen directly in front of the operator. Upon the joy stick is mounted a button trigger for controlling machine gun fire, which is audibly denoted by a magnetic hammer striking a sounding board so as to produce a staccato sound effect. The target comprises a simulated aircraft, which is also projected upon the screen by a universally-mounted projector, whose position is controlled by electrically-actuated switching mechanisms responsive to respective positions of the joy stick and rudder pedals. The joy stick is also adapted for controlling an audio frequency oscillator, the output of which is connected to a loud speaker for audibly denoting the drone of a simulated aircraft engine in climbing, diving, etc. In front of the operator is placed a scoreboard for recording the number of hits upon the target aircraft and also the number thereof destroyed, a simulated explosion of varying colors being projected upon the screen for indicating destruction of each plane after a predetermined number of such hits have been registered thereon. The operator has a predetermined time, as controlled by a timing device, to test his skill by the number of planes he is capable of shooting down. After the predetermined time has elapsed, a cloud or horizon simulator is projected upon the screen to indicate idling status of the device.

Other objects and a fuller understanding of the invention may be had by referring to the following description and claims, taken in conjunction with the accompanying drawings in which like parts are designated by like reference characters, and in which:

Fig. 1 illustrates a simulated aircraft housing in which an operator is shown seated before a set of typical aircraft controls and also before a screen upon which are flashed images from a plurality of schematically shown projectors disposed within the housing, Fig. 2 illustrates a front view of the above-mentioned screen depicting permanently imposed cross-braces of a glass-enclosed cockpit, ring sights of a fixed machine gun, and a score board, Fig. 3 illustrates more or less schematically a pair of motor-driven mechanisms disposed 90° apart for universally driving the plane projector, Fig. 3a is a fragmentary view of the plane projector viewed at right angles to the position shown in Fig. 3 and Fig. 4 illustrates a schematic diagram of the electrical circuit for operating the device.

Referring now to Fig. 1, there is shown a fusilage 10, preferably formed along aeronautical lines, at one end of which is provided a seat 11 for an operator 12 who is in close proximity to a screen 13, of any suitable material, mounted in line with the operator's vision, and to whom are readily accessible conventional aircraft controls, such as a joy stick 14 and a pair of rudder pedals 16. Projecting from the front of the fusilage 10 is shown a simulated machine gun barrel 17 having at its extremity a lamp 18, which flashes periodically in simulation of machine gun fire. While only one machine gun barrel is shown it is, of course, understood that additional machine guns may be suitably mounted to heighten the illusion of a fighter plane. Underneath the screen 13 is supported in any suitable manner a score board or annunciator 19 for indicating, by illuminated characters (Fig. 2), the number of hits registered and also the number of aircraft destroyed, which will be described hereinafter.

To the two rudder pedals 16 (only one of which is shown), which are pivotally mounted on links 21 supported by a frame member 22, are connected respective linkages comprising a rod 23 connected to one arm of a bell crank 24 pivotally mounted upon frame member 22. As shown, the right rudder pedal 16 is adapted to rotate crank 24 counter-clockwise, as viewed in Fig. 1 and correspondingly, although not shown, the left rudder pedal 16 is adapted, through any well-known linkage, to rotate the crank 24 in an opposite direction, namely, clockwise. The other arm of crank 24 is connected to one end of a link rod 26, which, in turn, is connected at its other end to a pin 27 pivotally supported by a link 28. A link 29 interconnects rod 26 with a regulating arm 31 of a rotary drive mechanism 32 having a spherical segment 33 adapted for contacting engagement with a pictorial sphere 34. A detailed description of the rotary drive 32 is not included herein inasmuch as any suitable drive, such as disclosed in my hereinbefore-mentioned Patent 2,289,877 or preferably in my copending application, Serial Number 605,264, now abandoned, filed on July 16, 1945, may be used. Also, a detailed description of the sphere 34 is not made herein since the features thereof are also disclosed in my above-mentioned Patent 2,289,877. It is sufficient to say that sphere 34 includes on its peripheral surface terrestrial objects, such as the earth, sky, etc., which are adapted to be suitably flashed upon the screen 13.

To the joy stick 14, which is universally supported upon a base 36, is connected at its lower end an angularly-shaped arm 37, which is connected to one end of a rod 38 adapted for translatory movement in response to movement of the joy stick 14. The other end of rod 38 is joined by a link 39 to one arm of a bell crank 41, the other arm of which is pivotally connected to one end of a tie rod 42. The other end of tie rod 42 is connected to one arm of a bell crank 43, the other arm of which is connected to a rod 44 which, in turn, is connected to an adjusting arm 46 of a rotary drive 47 having a spherical segment 48 adapted for contacting engagement with sphere 34. As shown, rotary drives 32 and 47 are similar in design, being disposed at 90° with respect to each other, and are adapted to be continuously driven by any suitable power means (not shown), the speed and direction of movement imparted to sphere 34 being dependent upon the angle at which driving segments 33, 48 engage sphere 34.

The objects on the terrestrial sphere 34 are projected upon screen 13, by natural or artificial light reflected therefrom, the angle of projection thereon being shown by the dash lines extending from sphere 34 to the screen. To properly focus the images thereof on screen 13, a lens 49 is interposed, as shown, between the screen 13 and sphere 34. It is to be noted that, as the sphere 34 rotates under influence of the rotary drives 32, 47, different portions of the sphere will be projected upon the screen 13 and it is to be further noted that the portions of the sphere 34 that are projected upon the screen 13 are dependent upon the positions of the joy stick 14 and rudder pedals 16, which are controlled by the operator 12.

To simulate a target, which the operator 12 may endeavor to destroy, a universally mounted aircraft or plane projector 51 is provided for projecting the image of an aircraft upon any part of the screen 13, the projector 51 being of well-known construction comprising the usual tubular member within which are included the customary lamp, suitable lenses, and a stencil perforated with a rear view of an aircraft, as the object or target that is to be projected on the screen 13. The control mechanism for directing the aircraft projector 51 will be described hereinafter.

Upon the joy stick 14 is shown mounted a trigger 52, preferably of the button type, which when pressed by the operator 12 causes a simulated burst of fire to be discharged from the machine gun 17, lamp or lamps 18 lighting at each actuation of the trigger 52, which also actuates a tracer bullet projector 53. This projector emits a beam of light that impinges upon a polygonally-shaped rotating mirror 54, which, as it rotates, reflects a series of white dots starting from beyond the lower extremity of the screen and disappearing into the center thereof. The upward sweep of the "tracer bullets" is terminated by a light guard member 55 surrounding the major portion of the mirror 54. The mirror 54 is rotated by the motor shown schematically at 54'. Actuation of the trigger 52 also sets into play a sounder or magnetic hammer 56, supported upon a sounding board 57, hammer 58 intermittently striking the sounding board 57 to provide a staccato noise in simulation of machine gun fire.

For simulating the sound of an aircraft engine, there is connected to rod 38 of the linkage for the joy stick 14 a wire 59 secured at one end to a pin 61, in turn fixedly mounted upon rod 38, wire 59 being looped around a roller 62 supported upon frame member 22. The other end of wire 59 is connected intermediate the ends of an arm 63, the outer end of which is biased by a spring member 64 and the inner end of which is shown connected to a tone control element 66 of an audio-frequency oscillator 67 of any suitable type. As the rod 38 is moved longitudinally, that is, from left to right or vice versa, as viewed in Fig. 1, arm 63 is adjustably moved to vary the tone control element 66 and, in turn, the frequency of the oscillator 67, the output of which is connected by suitable wires (not shown) to a loud speaker 68 mounted upon a sounding board 69. As the joy stick 14 is moved, the loud speaker 68 emits a tone of varying frequency, which simulates the drone of an aircraft engine in gliding, diving, etc.

As mentioned hereinbefore, at every hit made on the target a visual indication is registered upon the score board 19 (Fig. 2) in plain view of the observer 12; for example, the first hit may be indicated by an illuminated character $$\frac{1}{\text{Hit}}$$

the second hit by illuminating character $$\frac{2}{\text{Hit}}$$

and extinguishing character $$\frac{1}{\text{Hit}}$$

etc. In addition, an audible sound is produced by an electro-magnetically operated gong 69' at each hit. Further, after a predetermined number of hits is registered, say three, the target (aircraft) may be considered destroyed and to illustrate destruction thereof there is provided an explosion projector 71, which is adapted to project on the screen 13 the image of an explosion comprising various colors with a silhouette of an aircraft disintegrating. The explosion image is also accompanied by a sound of the gong 69', the No. 2 hit registered on the score board 19 being extinguished and the square marked 1 being illuminated, say with a small flag of an enemy nation with the numeral 1 in the center. Every third hit, therefore, results in the lighting up of a flag representing a downed enemy plane. The explosion image remains on the screen for a short interval of time, preferably a second or two, after which it disappears and another enemy plane appears from any one of several places and flying in any direction.

While the device is in an idle state, i. e., unoccupied by an operator 12, a lamp 72 in a cloud and/or horizon simulator 73 is illuminated. The heat generated by lamp 72 rotates a transparent drum 74, preferably of Celluloid, upon which is depicted a scene representing a horizon, including a part of the earth and sky as viewed from a plane in flight, and this is projected upon the screen 13.

In Fig. 2 is shown a front view of a simulated aircraft cockpit or nose including the screen 13, score board 19, and ring sights 76 of a fixed machine gun (not shown). As will be described hereinafter in greater detail, the image of the target plane upon being maneuvered within the ring sights 76 by the operator 12 will cause the aircraft projector 51 to be oriented at a predetermined angle, which angle will result in a hit being recorded on the score board 19, assuming, of course, that the trigger button 52 is actuated.

Referring to Fig. 3, the mechanism for universally directing the plane projector 51 will be described. As shown, the projector 51 is universally supported upon gimbals 77, of usual type, to permit the projected beam of light, including the target, to move in any direction horizontally or vertically, or any combination thereof, upon the screen 13. This gimbal mounting may, as shown, consist of the ring 77 which supports projector 51 through journal pins 77a. The ring 77 is itself supported on journal pins 77'a journaled in stationary bearing supports 77', the pins 77'a being at right angles to pins 77a. Movement of the projector 51 is controlled by a pair of mechanical drives 75, 75' disposed at 90° with respect to each other, drive 75 being operable in the vertical plane and the drive 75' in the horizontal plane. The drives 75, 75' are identical and each comprises geared motors 78 and 78' adapted to rotate cranks 79 and 79' through suitable gears (not shown) at a comparatively low speed. Cranks 79 and 79' are connected, respectively, by connecting rods 81 and 81' to cross heads 82 and 82', which are guided on guide rods 83 and 83'. Cross heads 82 and 82' are connected, respectively, with projector 51 by ball-socket linkages 84 and 84', as shown. It is thus apparent that, if one drive assembly, say 75', moves the projector 51 horizontally, the other drive assembly 75 will move the projector vertically, a combination of the two drives 75, 75' providing a universal projection of the image on the screen. Cross heads 82 and 82' are provided with abutments 86 and 86' adapted to open contacts 87, 88 and 87' and 88' at each extremity of its travel. As shown in the lower drive 75', the cross head abutment 86', being at one end of its travel, has opened contact 88'.

The driving motors 78 and 78' are preferably of the reversible type, being connected to a suitable source of energy through a double-pole double-throw switch 89, preferably of the quick-acting type, which in one instance may be connected to one set of poles and in the other instance to a reversed set of poles. The switch 89 (see Fig. 1) is centered with the center or neutral position of link rod 38, which is under control of the joy stick 14. It is to be understood that the switch 89 will always complete an electric circuit to the motor 78 of the drive 75, while the device is in operation. Disposition of switch 89 to one side of the center will cause the motor to run, say clockwise, while disposition to the other side of the center will cause a reversal of the switch contacts with a subsequent counter-clockwise rotation of the motor 78. A similar second double-pole double-throw switch 91 is disposed on link 26 (see Fig. 1), which is controlled by the rudder pedals 16. The function of this switch is to reverse the motor 78' of the horizontally mounted drive 75' and, as in the first switch 89, is centrally mounted on link 26, so that movement in either direction from this central position will actuate switch 91. Thus, control is established over the projected aircraft target image, as seen on the screen. Concurrent with any change in control of the motors 78 and 78' it will be apparent that through the respective linkages coupled to the joy stick 14 and rudder pedals 16 there will be also a change in direction and speed of rotation of the terrestrial sphere 34.

Disposed at the rear of the projector 51 (see Fig. 3) there is disclosed a contact 92 centrally mounted on a convex surface 93, while rigidly mounted upon part of the fusilage 10 by a bracket 94 is shown a second contact 96 biased outwardly by a spring 97. Contact 96 is so disposed as to engage contact 92 only when the projector 51 is directing its projected image of the target in the center of the gun sights 76 (Fig. 2) on the viewing screen 13. It might be pointed out at this time that, upon engagement between contacts 92 and 96, and upon pressing the trigger 52, the previously-described so-called "hit" is registered upon the enemy aircraft (target).

The general operation of the device is as follows: Upon starting the device by coin or otherwise, there will appear before the operator 12 on the screen 13 a moving image, representing the view as seen from an airplane in flight, while gliding across the screen from any extremity thereof will appear the image or outline of a target, such as an enemy aircraft, flying in front of him. It will be the object of the operator to direct the aircraft (target) by means of the joy stick 14 and rudder pedals 16 to a position within the ring sights 76 of a fixed machine gun. This, of course, is different from the usual practice of large combat planes wherein both the machine gun and target are movable. The operator will first observe that by moving either the stick 14 or pedals 16 there will be an apparent change in direction of the aircraft's flight and in speed and/or direction of the plane image which crosses the screen and momentarily disappears, only to re-appear from a different angle a second or two later. Therefore, movement of the stick 14 or pedals 16 will cause the image seen on the screen to appear approximately as would be the field of view of the operator 12 were he in actual flight in a real plane. Moving the controls also results in apparently changing the course of the operator's plane with reference to the image of the target plane appearing before him on the screen. For example, if the target plane on the screen 13 is moving diagonally from upper left to lower right, the operator can overtake this aircraft by pulling back on the stick 14, which gives the illusion of the horizon lowering and the plane image descending. If simultaneously he kicks in the left rudder pedal 16, the earth's surface starts drifting to the right and the plane's image approaches the center of the screen, having described a change in course and speed. Thus, it is readily apparent that by moving the proper control in the correct direction and degree, the target plane's image on the screen can be brought into register with the gun sight pattern fixedly impressed on the screen 13.

When the operator has maneuvered the target plane within the bounds of the ring sights 76, he will press trigger 52 with his thumb, which may just as well be a hand-grip type of trigger mechanism, and immediately there will appear upon the screen 13 a series of white dots starting from beyond the lower extremity of the screen and disappearing into the center of the simulated ring of the gun sights 76. The illusion thus created is that of machine gun tracer-bullet fire converging in the sight area. At the same time lamp 18 in machine gun barrel 17 will flash, thereby further giving the illusion of machine gun fire, the light therefrom reaching the screen 13, for example, through the globe 34. Accompanying this is a rapid staccato noise, produced by the magnetic hammer 56, representing the actual sound of machine gun fire. This staccato noise is heard over and above the drone of a simulated airplane engine emitted by the loud speaker 68, which is connected to the audio-frequency oscillator 67. As described hereinbefore, the frequency of the oscillator 67 is coordinated with the stick 14 in such a manner as to convey the increased tempo of sound vibration of a plane diving, or the slower throb of a plane in a steep climb.

The operator 12 now being versed in the action of the plane controls and aware of the results that might be obtained, attempts to bring his gun sight to bear upon the elusive plane flying ahead of him. Maneuvering the enemy plane into his sights, and pressing the trigger 52 results in a single stroke of gong 69' and the register of No. 1 hit on the score board 19. The enemy plane is damaged but not shot down. The operator must again attempt to score a hit and upon the second successful burst of fire, the score board 19 registers hit No. 2, hit No. 1 being extinguished. Upon the third successive hit, the image of the enemy plane immediately disappears. In its place on the screen is projected in various colors the simulation of an explosion, and a silhouette of a plane disintegrating. This new image is accompanied by a sound of the gong 69, illuminated hit No. 2 is extinguished, and preferably a small lighted flag, say of an enemy nation, with the number 1 in the center is illuminated. Thus, every third hit results in the lighting up of an enemy flag with a centrally disposed numeral indicating the number of planes destroyed. There is a pause of a second or two after each explosion takes place, the explosion image then disappearing, after which from any one of several places another enemy plane appears on the screen 13.

The operator has a predetermined period of time in which to shoot down as many planes as his skill will allow him. This time limit may be controlled by a timing device (not shown) operated by a coin controlled device, if desired. At the completion of the set time limit all lights on the screen 13 go off and there appears, in their place, a steady drifting illusion of clouds, for example, produced by cloud simulator 73. This lighting effect is primarily designed to attract attention whenever the machine is idle. The device, therefore, is now in readiness for another repetition of the above-described operational cycle.

The electrical circuit operation of the device, as disclosed in Fig. 4, will now be described. As mentioned hereinbefore, the mechanism may be started by a coin, which closes an electric circuit including a timing switch 98, of any usual type, which may be connected at the line side of a transformer 99, of suitable size and type, energized by any suitable source 100 of alternating current. It is, of course, understood that the invention is not to be limited to an alternating current source as a direct current source or direct current derived potential may be used as well. The secondary winding of the transformer 99 is preferably provided with six-volt and twenty-four-volt taps, which are adapted to be connected by suitable wires to the component apparatus.

While not shown, closure of the timing switch 98 will set into operation the mechanical drive motors 78 and 78', illuminate sphere 34, whereby terrestrial objects are projected upon the screen 13, and preferably also de-energize the lamp 72 in the cloud simulator 73, which, as mentioned hereinbefore, is effective only during the idle period of the device. In addition, the motor (not shown) for rotating the mirror 54 may be energized through any suitable control connected with the timing switch. Rotation of the mirror at this time, however, is ineffective inasmuch as the tracer bullet projector 53 is extinguished. Immediately following closure of the timing switch 98, the aircraft projector 51 containing the object of the target is illuminated and the aircraft image will be seen moving over the screen under control of the motors 78 and 78'. The circuit for energization of the projector 51 may be traced from the upper six-volt tap of transformer 99 over leads 102, 103, through lamp (not shown) of projector 51, over lead 104, through upper break contact of relay 106, and thence back over leads 107, 108 to the lower six-volt tap of transformer 99.

Assuming that the operator has maneuvered the aircraft target within the sights 76 and pressed the trigger button 52, which is normally biased in an inoperative position by a spring 107', pressure of the trigger 52 results in a closure of switch contact 110, which closes an energizing circuit for relay 109. This energizing circuit may be traced from the upper six-volt tap over conductors 102, 111, through the winding of relay 109, closed contact 110 and back over conductor 112 to the lower six-volt tap. Relay 109 in operating, at its upper front contact closes an energizing circuit for tracer bullet projector 53, which can be traced from the upper six-volt tap via conductors 102, 113, through projector 53, over conductor 114, through upper front contacts of relay 109, back over conductors 116 and 108 to the other six-volt tap. At the lower front contact of relay 109 a circuit is energized for the magnetic hammer 56, which is of the customary vibrating type and which can be traced from the upper terminal of the twenty-four-volt tap, over conductors 117, 118, through lower front contact of relay 109, conductor 119, break contact of magnetic hammer 56 through the winding thereof, and thence back over conductors 121 and 122 to the other terminal of the twenty-four volt tap; and at the intermediate front contact of relay 109 an obvious circuit is closed for lighting machine gun lamp 18.

Operation of the tracer bullet projector 53 causes a stream of tracer bullets to appear on the screen and intermittent operation of the magnetic hammer 56 produces a staccato noise simulating a machine gun. Assume next that the plane projector 51 is moved into its optimal position where engagement between contacts 92 and 96 is made. A circuit is then closed for actuating gong 69, which may be traced from the upper twenty-four-volt tap, over conductors 117, 118, through lower front contact of relay 109, over conductor 119, through contacts 96, 92, over conductors 123, 124, through winding of gong 69, and back over conductors 126 and 122 to the lower twenty-four volt tap. At the same time a circuit is closed for the step magnet 127 of score board 19 to rotate switch arm 128 clockwise, as by a pawl and ratchet mechanism, in the direction of the arrow, from its home or non-engaging position into engagement with the lower left contact 129. The energizing circuit for step magnet 127 may be traced from the upper terminal of the twenty-four-volt source over conductors 117, 118, through lower operated front contact of relay 109, over conductor 119, through contacts 96, 92, over conductors 123, 131, through winding of step magnet 127, and back over conductors 132 and 122 to the lower terminal of the twenty-four-volt source. A circuit is now closed for energization of lamp $$\frac{1}{\text{Hit}}$$

which indicates registration of one hit. This circuit can be traced from the upper six-volt tap over conductor 102, through lamp $$\frac{1}{\text{Hit}}$$

conductor 133, contact 129, switch arm 128, and back over conductors 134 and 108 to the lower six-volt tap of transformer 99.

A second impulse of current produced by closure of contacts 92 and 96 will energize step magnet 127 again and cause switch arm 128 to rotate into engagement with contact 136, which energizes a circuit for lamp $$\frac{2}{\text{Hit}}$$

thereby indicating a second hit. This circuit can be traced from the upper six-volt tap over conductor 102, through lamp $$\frac{2}{\text{Hit}}$$

over conductor 137, through contact 136, switch arm 128, and thence back over conductors 134 and 108 to the lower six-volt tap. Upon disengagement of arm 128 with contact 129 lamp $$\frac{1}{\text{Hit}}$$

is extinguished. Upon the third impulse of current through step magnet 127, the switch arm 128 is stepped into engagement with contact 138 to close an energizing circuit for lamp 1, which circuit may be traced from the upper terminal of the six-volt source over conductor 102, through lamp 1, conductor 139, terminal 141 of a second bank of switch contacts actuated by step magnet 127, switch arm 142 of this bank, and thence back over conductors 143, 134, and 108 to the lower terminal of the six-volt supply. Upon disengagement of switch arm 128 with contact 136 the above-traced circuit for lamp $$\frac{2}{\text{Hit}}$$

is opened and the lamp extinguished.

At the same time, a circuit is closed for relay 106, which circuit can be traced from the upper terminal of the twenty-four volt source, over conductors 117, 144, through switch arm 128, contact 138, via conductor 146, back contact of relay 147, lower break contact and winding of relay 106, over conductor 148, through break contacts 87, 88, and thence back over conductors 149 and 122 to the lower terminal of the twenty-four volt source. Relay 106 operates and at its upper break contact opens the hereinbefore-traced operating circuit for the plane projector 51, the lamp therein being extinguished; as its upper front contact closes an energizing circuit for the explosion projector 71, which can be traced from the upper terminal of the six-volt source, over conductors 102, 151, through the explosion projector 71, via conductor 152, upper front operated contact of relay 106, and back over conductors 107 and 108 to the lower terminal of the six-volt source. As described hereinbefore, the explosion projector 71 projects upon the screen 13 an image of a plane disintegrating.

Upon operation of relay 106 the original operating circuit therefor is opened at its lower break contact, but before the relay is permitted to release a locking circuit is provided therefor, which circuit can be traced from the upper terminal of the twenty-four-volt source, over conductors 117, 153, lower front contact and winding of relay 106, and back over conductor 148, via contacts 87, 88, conductors 149 and 122 to the lower terminal of the twenty-four-volt source. The explosion projector 71 will remain energized and the plane projector 51 de-energized until either one of contacts 87 or 88 is opened by the mechanical drive mechanism illustrated in Fig. 3, whereupon the relay 106 releases, after which the explosion projector 71 is de-energized and the plane projector 51 is reoperated. To prevent repetitious operation of relay 106 during the interval that switch arm 128 is resting on contact 138 and until the next hit is registered on score board 19, a slow operate relay 147 is provided in the twenty-four-volt circuit with a break contact serially interposed in the original operating circuit for relay 106. The operation of relay 147 is delayed sufficiently to permit operation of relay 106. The operating circuit of relay 147 may be traced from upper twenty-four-volt tap over conductors 117, 144, through switch arm 128, contact 138, via conductor 146, winding of relay 147, and thence over conductors 150 and 122 to the lower twenty-four-volt tap. Relay 147 upon operating opens the operating circuit for relay 106 and is released when switch arm 128 is disengaged from contact 138.

The above operation is repeated, every three hits being indicated by a subsequent numbered lamp, all of which remain lighted. After the predetermined period of time has elapsed, the timing switch 98 opens and disconnects the source of supply 100 from the device, cloud simulator 73 being energized as mentioned hereinbefore, and the various lamps, motors 76, and sphere 34 are restored to their normal inoperative condition.

A reset magnet 154 is provided for resetting the switch arms 128, 142 to their original or home positions when a resetting switch 156 is closed. The circuit therefor may be traced from the upper twenty-four-volt tap, over conductors 117, 157, through winding of reset magnet 154, closed reset switch 156, and back over conductor 122 to the lower tap of the twenty-four-volt source. The reset switch 156 may be operated by the coin control device or may be operated in conjunction with the timing switch 98. The electrical connections for an audio-frequency oscillator 67 are not shown, nor are the interconnecting leads between the oscillator and the loud speaker 68, inasmuch as these connections are well understood.

While this invention has been shown and described as embodying certain features merely for the purpose of illustration, it will be understood that it can be used in many other and widely varied fields without departing from the spirit of the invention and the scope of the appended claims. For example, two operator's positions may be provided in which one operator, called the pursuer, controls the driving mechanism for the sphere 34 and the machine gun firing mechanism, while the other operator, called the pursued, controls the plane projector 51 through the use of a duplicate set of controls.

What is claimed is:

1. A device for simulating air combat comprising, in combination, a screen, a projector for projecting the image of a target on said screen, means for varying the position of said target image on the screen, means responsive to an operator for controlling said position varying means, means including a projector for projecting on said screen at a predetermined fixed point an image simulating destruction of said target, means for activating said second projector including a switch which is effective only when the target image projector is in a predetermined position and registering means controlled in part by said switch for registering the number of times said destruction simulating projector has been activated.

2. In an amusement device for simulating aircraft flight, means including an electric circuit for universally projecting a target upon a screen, means including a second electric circuit responsive to a predetermined position of said target on said screen for rendering said first circuit ineffective, and means including a third circuit responsive to said second circuit for simulating on said screen destruction of said target while said first circuit is ineffective.

3. In a device adapted for simulating aircraft in combat, a screen, means for projecting terrestrial images on said screen, means for projecting an image of an aircraft on said screen, means for controlling said first and second means, means including an explosion projector for projecting an image simulating destruction of said aircraft, a start circuit for initiating operation of said device, an electric circuit responsive to said start circuit for energizing said aircraft projector, an electric circuit for energizing said explosion projector, and a cut-over circuit responsive to a predetermined position of said aircraft projecting means for rendering said aircraft projector circuit ineffective and said explosion projector circuit effective.

4. In a device adapted for simulating aircraft flight, a screen, means for projecting terrestrial images on said screen, means for projecting an image of an aircraft on said screen, control means for variably actuating said first and second means, means including an explosion projector for projecting an image simulating destruction of said aircraft, means for audibly simulating machine gun fire, a start circuit for initiating operation of said device, a manually operable trigger circuit for initiating such audible simulated machine gun fire, an electric circuit responsive to said start circuit for energizing said aircraft projector, an electric circuit for energizing said explosion projector, and a cut-over circuit responsive jointly to said trigger circuit and to a predetermined position of said projecting means, for rendering said aircraft projector circuit ineffective and said explosion projector circuit effective.

5. The combination in a device intended to simulate air combat, of a screen, means for projecting thereon a flight scene, means including aircraft control members for controlling said projecting means to shift said scene in simulation of flight, a gun sight visible to the operator of the device relative to said screen, a universally mounted projector adapted to project on said screen an aircraft image, means responsive to one of said control members for moving said projector to shift said image vertically, means responsive to another of said control members for moving said projector to shift said image horizontally, indicating means actuated by said projector when in position to project said image on said screen in line with said gun sight, means for projecting on said screen a simulation of an exploding aircraft, means actuated by a determinate number of operations of said indicating means to operate said explosion projecting means.

6. The combination in a device intended to simulate air combat, of a screen, means for projecting thereon a flight scene, means including aircraft control members for controlling said projecting means to shift said scene in simulation of flight, a gun sight visible to the operator of the device relative to said screen, a universally mounted projector adapted to project on said screen an aircraft image, means responsive to one of said control members for moving said projector to shift said image vertically, means responsive to another of said control members for moving said projector to shift said image horizontally, indicating means actuated by said projector when in position to project said image on said screen in line with said gun sight, means for projecting on said screen a simulation of an exploding aircraft, means actuated by a determinate number of operations of said indicating means to operate said explosion projecting means, and means for discontinuing the operation of said aircraft image projector during operation of said explosion projecting means.

7. The combination in a device intended to simulate air combat, of a screen, means for projecting thereon a flight scene, means including aircraft control members for controlling said projecting means to shift said scene in simulation of flight, a gun sight visible to the operator of the device relative to said screen, a universally mounted projector adapted to project on said screen an aircraft image, means responsive to one of said control members for moving said projector to shift said image vertically, means responsive to another of said control members for moving said projector to shift said image horizontally, indicating means actuated by said projector when in position to project said image on said screen in line with said gun sight, means for projecting on said screen a simulation of an exploding aircraft, means actuated by a plurality of operations of said indicating means to operate said explosion projecting means, and means for indicating each operation of said explosion projecting means.

8. The combination in a device intended to simulate air combat, of a screen, means for projecting thereon a flight scene, means including aircraft control members for controlling said projecting means to shift said scene in simulation of flight, a gun sight visible to the operator of the device relative to said screen, a universally mounted projector adapted to project on said screen an aircraft image, means responsive to one of said control members for moving said projector to shift said image vertically, means responsive to another of said control members for moving said projector to shift said image horizontally, indicating means actuated by said projector when in position to project said image on said screen in line with said gun sight, means for projecting on said screen a simulation of an exploding aircraft, and means for discontinuing operation of said aircraft image projector during operation of said explosion projecting means.

9. The combination in a device intended to simulate air combat, of a screen, means for projecting thereon a flight scene, means including aircraft control members for controlling said projecting means to shift said scene in simulation of flight, a gun sight visible to the operator of the device relative to said screen, a universally mounted projector adapted to project on said screen an aircraft image, means responsive to one of said control members for moving said projector to shift said image vertically, means responsive to another of said control members for moving said projector to shift said image horizontally, indicating means actuated by said projector when in position to project said image on said screen in line with said gun sight, means for projecting on said screen a simulation of an exploding aircraft, means for discontinuing operation of said aircraft image projector during operation of explosion projecting means, and means for determining the period of operation of said explosion projecting means.

ALBERT G. DREYER.

REFERENCES CITED

The following references are of record in the file of this patent:

UNITED STATES PATENTS

| Number | Name | Date |
|---|---|---|
| 2,089,901 | Kollmayer | Aug. 10, 1937 |
| 2,287,429 | Hooker et al. | June 23, 1942 |
| 2,289,877 | Dreyer | July 14, 1942 |
| 2,310,084 | Hooker | Feb. 2, 1943 |
| 2,335,257 | Binks | Nov. 30, 1943 |
| 2,336,436 | Beindorf | Dec. 7, 1943 |
| 2,352,101 | Hutter | June 20, 1944 |
| 2,364,070 | Haile | Dec. 5, 1944 |
| 2,369,418 | St. John | Feb. 13, 1945 |
| 2,373,313 | Jeandron | Apr. 10, 1945 |
| 2,374,401 | White | Apr. 24, 1945 |
| 2,382,777 | Dahlberg | Aug. 14, 1945 |
| 2,392,781 | Semjian | Jan. 8, 1946 |

FOREIGN PATENTS

| Number | Country | Date |
|---|---|---|
| 462,910 | Germany | 1928 |

OTHER REFERENCES

Chicago Apparatus Co. Catalogue, page 324, 1931.

Gunnairstructor, in Popular Science, April 1944.